United States Patent [19]
Wachtell et al.

[11] 3,963,894
[45] June 15, 1976

[54] TURBINE-NOZZLE MANUFACTURING APPARATUS

[75] Inventors: Richard L. Wachtell, Tuxedo Park; Edward C. Palmenberg, Nanuet, both of N.Y.

[73] Assignee: Chromalloy American Corporation, Orangeburg, N.Y.

[22] Filed: Apr. 14, 1975

[21] Appl. No.: 567,553

Related U.S. Application Data

[60] Division of Ser. No. 436,369, Jan. 24, 1974, Pat. No. 3,920,947, which is a continuation-in-part of Ser. No. 221,306, Jan. 27, 1972, Pat. No. 3,802,046.

[52] U.S. Cl. .............................. 219/69 E; 219/69 R
[51] Int. Cl.² ............................................ B23P 1/08
[58] Field of Search ............. 219/69 E, 69 M, 69 R, 219/69 V; 29/401, 402, 156.8 R, 156.8 B; 415/115, 216, 217, 218; 416/214

[56] References Cited
UNITED STATES PATENTS

| | | |
|---|---|---|
| 2,909,641 | 10/1959 | Kucyn ............................... 219/69 E |
| 3,156,808 | 11/1964 | Davies et al. ..................... 219/69 V |
| 3,399,443 | 9/1968 | Roy et al. ......................... 219/69 M |
| 3,566,068 | 2/1971 | Brunev et al. ..................... 219/69 M |

FOREIGN PATENTS OR APPLICATIONS

| | | |
|---|---|---|
| 814,202 | 6/1959 | United Kingdom ............... 219/69 E |

*Primary Examiner*—Bruce A. Reynolds
*Attorney, Agent, or Firm*—Hopgood, Calimafde, Kalil, Blaustein & Lieberman

[57] ABSTRACT

The invention pertains to component-part manufacture for a turbine-nozzle assembly, to take the place of certain single-piece investment castings currently in use for such assemblies, intended primarily for gas-turbine application. The construction basically employs a blade element of desired airfoil-section development, and two base members, each locally recessed to define a locating socket or opening for the respective longitudinal ends of the blade. The invention is specifically concerned with apparatus and techniques whereby the recesses are carefully controlled in their location with respect to base-member geometry, to the end that the assembly may produce a given performance-class number for the resulting nozzle, once assembled and united into an integral whole, by welding, brazing, coating and the like finishing steps.

5 Claims, 29 Drawing Figures

3,963,894

TURBINE-NOZZLE MANUFACTURING APPARATUS

This application is a division of our copending application Ser. No. 436,369, filed Jan. 24, 1974, (now U.S. Pat. No. 3,920,947) and said copending application is a continuation-in-part of our earlier application, Ser. No. 221,306, filed Jan. 27, 1972 (now U.S. Pat. No. 3,802,046).

This invention relates to the construction and reconstruction of nozzle assemblies and nozzle-component assemblies for use in gas turbines.

Turbine-engine nozzle guide vanes or blades are subjected to rapid extremes of temperature and differential-pressure loading, in the context of high flow rates, and as a result the individual parts comprising a nozzle assembly become bent, eroded and otherwise distorted. Any local departure of nozzle-throat area from design conditions establishes an asymmetry of flow and pressure distribution at any given engine stage, accelerating the destructive process. Since the nozzle assemblies, or nozzle-component assemblies as the case may be, are conventionally investment castings of superalloy materials, their replacement is expensive and various repair techniques attempt to salvage as much as possible of the original casting. Hot-forming, inlaying of blade edges, and filling are among the several techniques in use, all basically operative on the entire original casting, i.e., on the blade with its integrally case end-base members.

It is an object of the invention to provide a new construction for a nozzle assembly or nozzle-component assembly of the character indicated and lending itself to new-construction and to the repair or reconstruction of a worn assembly.

It is a specific object to achieve the above object in application to an assembly which is so far worn as to be deemed unacceptable for reconditioning by existing techniques and, therefore, consignable to the scrap heap.

It is a further specific object to achieve the foregoing objects with such a high degree of control of blade size, orientation and location that nozzle class can be specified and held within limits which are at least as close as those by which conventional original castings (or assemblies of original castings) are judged.

Another object is to provide a construction of the character indicated wherein investment-casting techniques and requirements are substantially simplified.

It is also an object to provide such a construction wherein a greater latitude is inherently available, as to choice and use of materials.

It is a general object to achieve the foregoing objects with constructions and methods which can be applied with relative simplicity using existing tools and technology, and at competitive and relatively low cost.

Other objects and various further features of novelty and invention will be pointed out or will occur to those skilled in the art from a reading of the following specification, in conjunction with the accompanying drawings. In said drawings, which show, for illustrative purposes only, preferred forms of the invention:

Briefly stated, in application to the repair of damaged gas-turbine nozzle structures, the invention contemplates removal of all original blade material and its replacement with new individually cast blades, relying upon precision machining of base-member material of the original structure in such manner as to orient the assembled parts and to permit the resulting nozzle-throat area to be controlled with a high degree of dimensional precision. The assembly is consolidated into an integral whole, by welding the new blades to the machined original base members, and by a high-temperature braze operation. Following this, the assembly is given a protective coating to minimize the effects of high-temperature oxidation.

Figures 1, 2, 3:
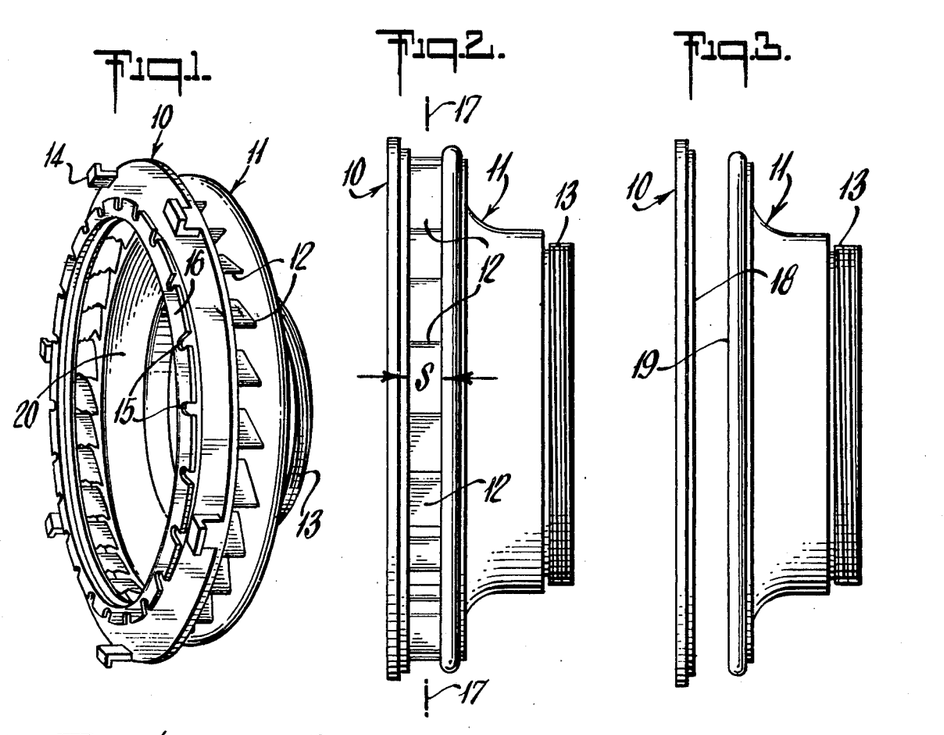
FIG. 1 is a perspective view of a gas-turbine nozzle assembly, being specifically a nozzle guide-vane assembly for an auxiliary power unit, and exhibiting wear such as to render the same unfit for further use, but nevertheless repairable in accordance with the invention.
FIG. 2 is a side elevation of the assembly of FIG. 1, to illustrate a first repair step of the invention.
FIG. 3 is a view as in FIG. 2, to illustrate another step.

The invention is first shown in application to the nozzle guide-vane assembly (FIG. 1) of a gas-turbine used in aircraft as an auxiliary power unit, i.e, a prime mover for stand-by generation of electric power. The particular assembly shown in FIG. 1 is a single investment casting of left and right annular base or vane-supporting members or rings 10-11, integrally united to an angularly spaced plurality of vanes or blades 12 for accomodating radially inward and circumferentially swirling flow of hot gases within the engine. The particular assembly is a stator within which a suitably formed impeller (not shown) is supported for rotation and for discharge of the gas flow axially out the right end of the right-hand base member 11. The conventional means of attachment of the stator to other engine structure include external threads 13 at the reduced discharge end of member 11, spaced radial lugs or feet 14 at the periphery of member 10, and clamp slots 15 in a radial flange 16 of member 10.

The stator of FIG. 1 is shown with substantial damage at all or most of the radially inner or trailing edges of the vanes 12. The extent of the damage is typical of that which would normally call for scrapping the entire stator assembly, i.e., replacement with a new and relatively expensive single integral investment casting of the entire stator. However, the present invention permits reconstruction of the stator to at least the performance capabilities of the original, but a fraction of the original cost.

Referring to FIGS. 2 and 3, the first step is to remove all blade material. This is suggested in FIG. 2 at 17, being an alignment for cutting (e.g., sawing) the vanes 12 at substantially mid-span. Once cut, vane fragments remain as cantilevered stubs, projecting axially from each of two, now separate, base members 10-11. Following a stress-relieving heat cycle, a machining operation (including surface grinding) is used to restore base member reference surfaces 18-19 (from which the original vanes 12 extended) to the desired degree of flatness. In this part of the process, it will be understood that, if necessary, any surface defects and deteriorated areas of the base members 10-11 are repaired by welding and remachining, as required to achieve the design reference surfaces 18-19. Also in this part of the process; the turbine scroll section 20 is repaired and/or machined as may be necessary to achieve design contour.

Figures 4, 8:
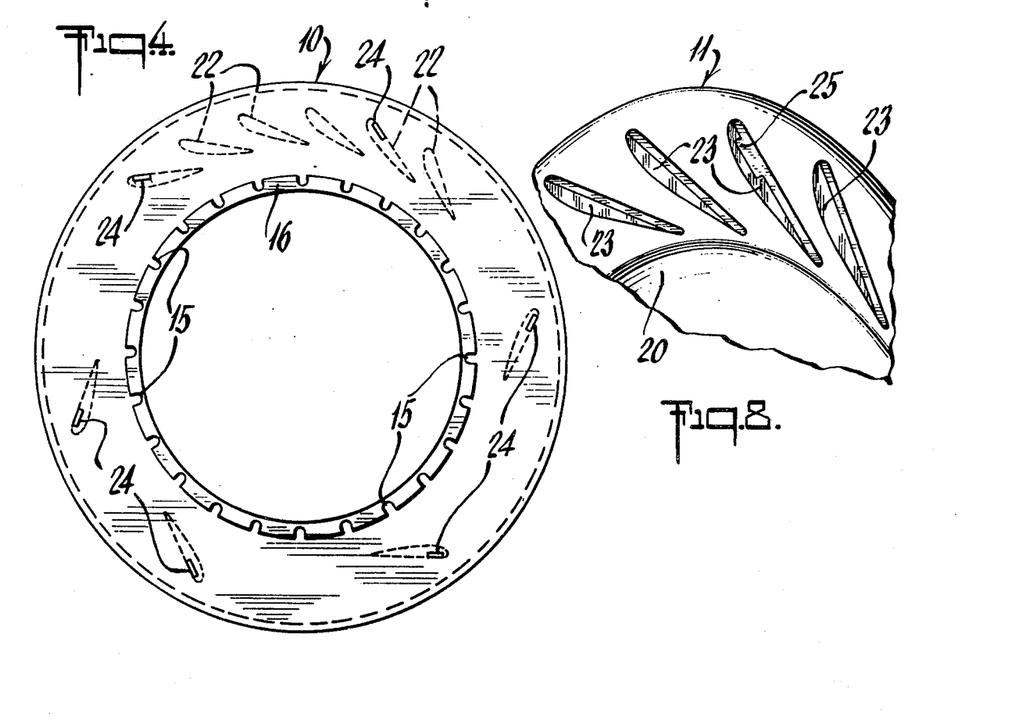
FIG. 4 is left-end view of the left base member of FIG. 3, to illustrate another step.
FIG. 8 is an enlarged fragmentary perspective view of the blade-supporting face of the base member at the right side of FIG. 3, to illustrate the step of FIG. 4 as applied to said base member.

The base-member reference surfaces 18-19 are now ready for machining to form airfoil-shaped sockets conforming to the vane-airfoil configuration. This step is preferably done by electrical discharge machining (EDM), i.e., spark-discharge removal of base-member metal, in a circulating dielectric medium. While this may be done as a succession of different socket-machining operations, it is preferred to generate all sockets in both reference surfaces 18-19 at one and the same time. More particularly, in a first step, all vane sockets 22 in base member 18 and all vane sockets 23 in base member 19 are machined to desired depth, and, in a second step only certain sockets are further bored all the way through the respective base members, as suggested at 24-25 in the respective base members, for tensioned blade-element anchorage, as will be explained. In a typical configuration wherein the net blade span S, i.e., between reference surfaces 18-19, is about 2.2cm, the machined depth of sockets 23 is about 0.06cm, in base member material which is in the order of 0.4cm thick.

Figures 5, 6:
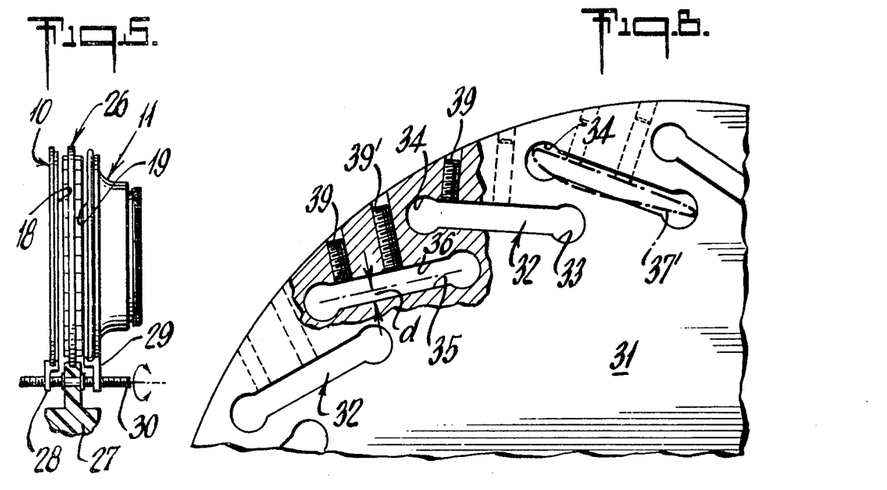
FIG. 5 is a simplified diagram to illustrate movable support of the members of FIG. 3 in conjunction with an electrical-discharge machining tool.
FIG. 6 is an enlarged fragmentary plan view of an electrode holder used in the apparatus of FIG. 5 for performing the step of FIG. 4, said view being partly brokenaway and in section to reveal internal construction.

FIG. 5 schematically shows support and manipulative means for performing the indicated EDM operation. Specifically, a tool-holder or electrode 26 is positioned by fixed means 27 within the dielectric bath, and the reference surfaces 18-19 of base members 10-11 are held by suitable support means 28-29, in face-to-face relation with each other and with adjacent parts of electrode 26. The support means 28-29 are shown as slides longitudinally displaceable in opposite directions, upon rotation of a differential lead screw 30 having a first direction of threaded engagement with means 28 and an opposite direction of threaded engagement with means 29. Thus, rotation of lead screw 30 will simultaneously feed or retract both base members 10-11 with respect to electrode 26, depending upon the direction of rotation, as suggested by a double-headed curved arrow. Of course, it will be understood that the support and guide system for tool and work includes adequate provision for holding strict axial alignment and angular register of tool and work at all times.

Figure 6A:
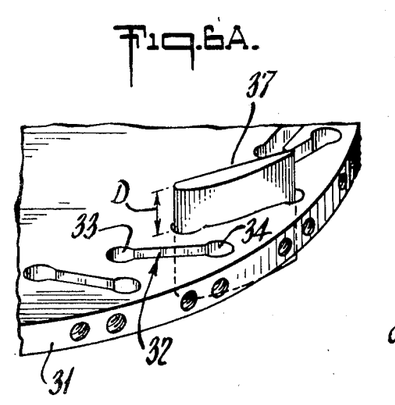
FIG. 6A is a fragmentary perspective view of the holder of FIG. 6, with a mounted electrode element.
Figure 6B:
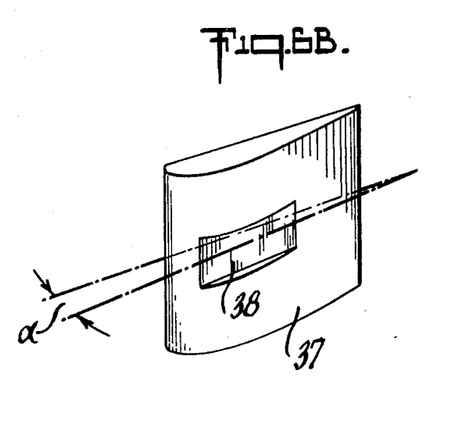
FIG. 6B is a perspective view of the electrode element of FIG. 6A.

FIGS. 6, 6A and 6B illustrate detail of the electrode structure for performing the first EDM step, namely, generating all vane-airfoil sockets 22-23. A relatively thick circular base plate 31 is characterized by plural spaced slot openings 32, larger than the vane-airfoil section but precisely positioned and formed in accordance with the design number and spacing of vanes 12. The inner and outer limits of openings 32 are formed as precisely indexed drilled holes 33-34, between which spaced substantially parallel inner and outer walls 35-36 complete the openings 32. Each inner wall 35 is a flat reference surface for positioning orientation of an inserted electrode element 37 (FIG. 6B) of vane-airfoil section; as shown, a locating flat 38 is milled or ground in the convex airfoil surface of electrode element 37 for positively referenced abutment with inner wall 35, said flat preferably straddling the region of closest proximity to the trailing (inner) edge of the next-adjacent vane. Wall 35 is offset in the amount $d$ from the line between centers for each pair of bores 33-34, the offset $d$ being selected to position the trailing (inner) edge of the electrode element 37 at substantially the point of intersection between said line and the inner side of the bore 33; this relationship is illustrated by phantom outline of an electrode-element airfoil section 37' at one of the openings 32 in FIG. 6 and will be seen to assure utmost radial-positioning accuracy in the insertion of each electrode element 37. Each element 37 is of the same axial extent, being selected to project by equal amounts D beyond both faces of the base plate or tool-holder 31. To secure such position, clamp screws 39-39' engage tapped holes between the outer wall 36 of each opening 32 and the peripheral wall of the plate;

and, as best seen in FIG. 6B, the airfoil surface of the electrode 37 is presented to receive the clamp forces of screws 39–39'. Preferably, the tapped holes for screws 39–39' are aligned to straddle the throat-defining region (closest proximity to trailing edge of adjacent airfoil), all as best seen in FIG. 6.

It will be seen that the described electrode base 31 and element 37 structure enables tool-room precision and techniques to be applied to the assembly of a particular electrode structure. Electrode-element material, which may for example be cast copper or graphite, machined tungstencopper or extruded copper, is conveniently formed as elongate bars, which need only be cut to length as needed for particular electrode elements 37. Then, depending upon the class number (throat area) desired for a particular vane assembly, the flat 38 is generated for all electrode elements 37 of the tool assembly, at a precise angle $\alpha$ to the flat surface or other reference axis of the airfoil section. For example, in the context of vane dimensions generally indicated above, and for a 23-vane stator of about 30 cm overall diameter, a useful succession of nozzle-throat areas is achievable with the same vane-airfoil section and same electrode-element stock, by machining the flat 38 at constant depth (at the throat-line region of the convex surface of the airfoil section) and at a selected angle $\alpha$ in the range 0'4" to 3'12", corresponding respectively to a total nozzle-throat area range of 40 to 50 $cm^2$.

Thus far, the detailed description has been concerned only with the first EDM step, namely, precision-forming of the airfoil sockets 22–23. The second EDM step involves boring the openings 24–25, to permit tensed anchorage of the assembly.

Figure 7:
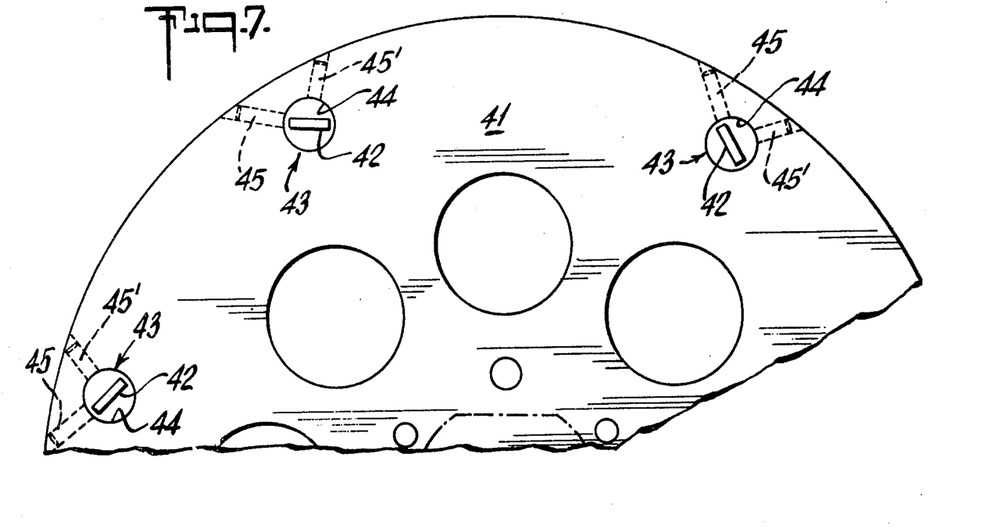
FIG. 7 is a view as in FIG. 6, to illustrate a second electrode holder used to perform the step of FIG. 4.

FIG. 7 illustrates another tool-holder or electrode base 41, of thickness and circular extent corresponding to the base 31, and usable at 26 (FIG. 5) in the work and tool-supporting and feeding mechanism. As shown, at spacings no more than every fourth vane position, the bottom of the vane socket is EDM-bored with a rectangular section, as determined by the end formation 42 of a rod-like electrode element 43. Each of the elements 43 is positioned in drilled bores 44 in plate 41, being securely held in position by clamp screws 45–45', the orientation of each projection 42 being preferably such that its elongation axis is parallel to the elongation axis of the socket bottom 22, 23. The EDM process proceeds as with the tool of FIGS. 6 and 6A, upon feeding rotation of lead screw 30 to full traverse of the base-member thickness, as will be understood.

Figure 9:
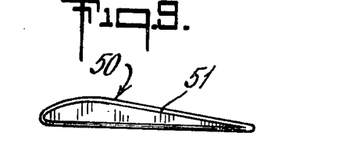
FIGS. 9 and 10 are, respectively, side-elevation and plan views of one kind of blade element to be assembled to the base members of FIGS. 4 and 8.
Figure 10:
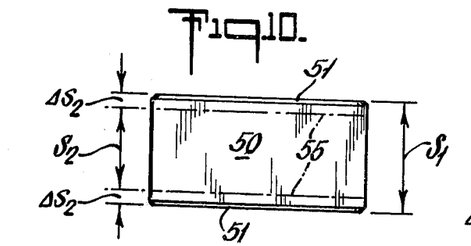
Figure 11:
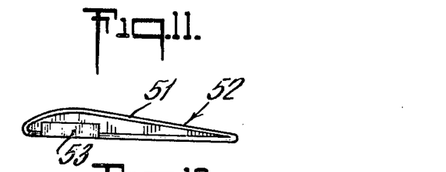
FIGS. 11 and 12 are views corresponding to FIGS. 9 and 10, respectively, to show a second kind of blade element to be assembled to the base members of FIGS. 4 and 8.
Figure 12:
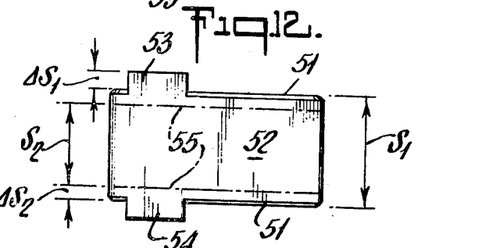

FIGS. 9 and 10 and FIGS. 11 and 12 respectively illustrate the two types of blade element used to complete assembly. The blade element 50 of FIGS. 9 and 10 is used at those socket locations 22–23 which are not provided with the through bores 24–25. Blade element 50 may be an individual investment casting of suitable alloy, or it may be cut to length $S_1$ from an elongate bar of extruded or otherwise formed alloy of vane-airfoil section. The length $S_1$ exceeds the ultimate vane span S, to the extent of the combined depths of socket recesses 22–23. Preferably, the span-end edges are chamfered, as indicated at 51, to permit secure bottom-referenced seating in sockets 22–23. The blade element 52 of FIGS. 11 and 12 may be similar in all respects to that of FIGS. 9 and 10, except for integral tang projections 53,54 beyond span $S_1$, of sectional proportions to fit the bores 24–25 and of projecting length $\Delta S_1$ to pass fully through bores 24–25. As a step preliminary to assembly to the EDM-processed base members 10–11, blades 50–52 are preferably given an electroplated coating of suitable "wetting" metal to an extent $\Delta S_2$, as indicated by light-phantom margin limits 55, at spacing $S_2$, in FIGS. 10 and 12. The spacing $S_2$ is preferably less than the ultimate vane span S so that fluxing treatment extends beyond base members 10–11, for fillet-holding purposes, as will become clear.

To complete the structure, all tang ends 53,54 are welded directly to members 10–11 at axially outer ends of the bores 24–25, thus providing tensed-tang retention of blade elements 52 in seated relation with associated socket bottoms (22–23); such retention also compressionally retains the remaining blade elements 50 in abutment with their socket bottoms (22–23). Additionally, a predetermined amount of brazing filler material (compatible with the material of the flux plating, to margins 55) is placed at each of the vane interfaces with members 10–11 to permit fillet formation and complete filling of the vane-ring joint. Brazing of the clamped assembly may be performed in a vacuum furnace after an appropriate heating and stabilization cycle at intermediate temperatures. After stabilizing for the proper brazing operation, the furnace is allowed to cool while maintaining the desired vacuum level and until a temperature of approximately 1500°F. is reached. Argon may then be admitted as a backfill gas to increase the rate of cooling to room temperature.

Figure 13:
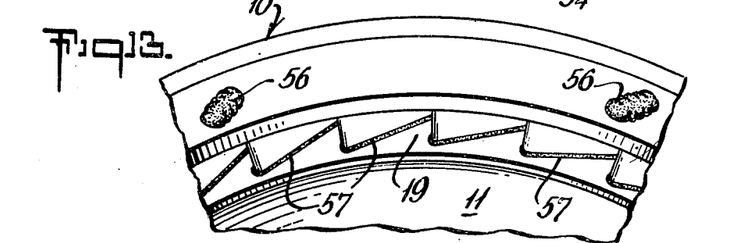
FIG. 13 is a fragmentary perspective view of the completed reconstruction of the assembly of FIG. 1.

The indicated welding and brazing operations produce weldments 56 (FIG. 13) and fillets 57, it being understood that the brazing material has achieved a void-free fill of the chamfered and other vane-socket interface regions. The completed assembly of FIG. 13 is then inspected for braze imperfections, and dimensional checks are made for throat-area control. Once past such checking, the assembly is given an overall protective coating to reduce the effect of oxidation and erosion at field conditions. It will be understood that weld techniques, brazing material, fluxing material, and the overall protective coating are selected for operating effectiveness in the context of the particular material employed. For example, suitable brazing, fluxing, wetting and coating techniques are described in detail, for the case of inserts of well-known cobalt-base and nickel-base superalloys, to existing investment castings, in copending application, Ser. No. 17,752, filed Mar. 9, 1970, now U.S. Pat. No. 3,650,635.

Figure 14:
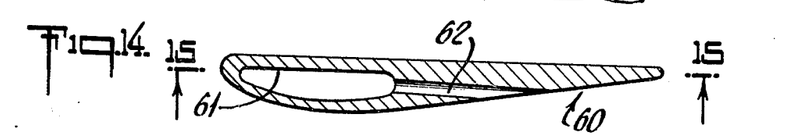
FIGS. 14 and 15 are views corresponding to FIGS. 9 and 10, respectively, to show a modified blade element, with FIG. 15 being partly in section at the plane 15—15 of FIG. 14 and in the context of adjacent base-member structure.
Figure 15:
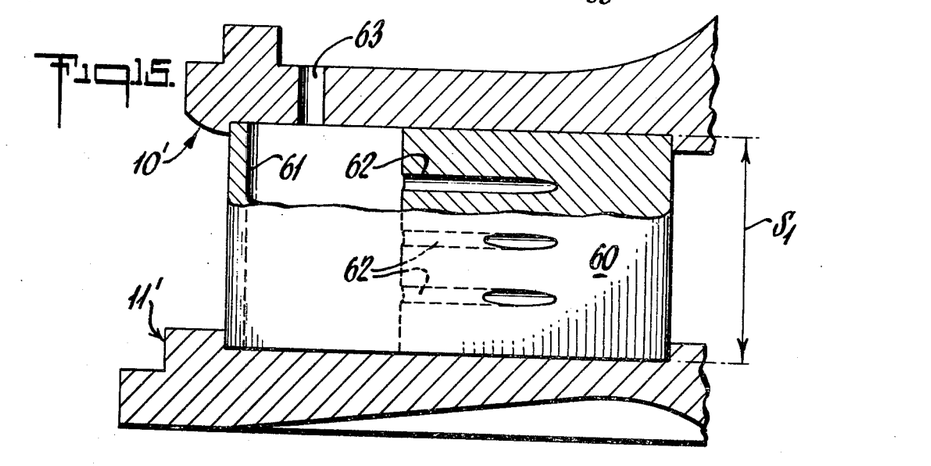

FIGS. 14 and 15 illustrate application of the invention to an upgrading of a given nozzle-vane stator assembly, in the sense that an air-cooling feature is incorporated in the vanes or blade elements 60, supported by socket fit to opposed supporting or base members 10'–11'. The blade elements 60 are formed with a manifold passage 61 extending the full span $S_1$ and within the leading-edge or maximum-thickness region of the blade section. Spaced elongated bleed passages 62 communicate with manifold 61 and discharge virtually tangential to the adjacent flow streamlines in the nozzle-throat region of the convex surface of the airfoil. Air-supply passages, as at 63 in base member 10', may be EDM-bored, using suitable electrode elements at 26 (FIG. 5) projecting in the direction of the upstream base member 10'. For those vane locations served by tangs, as at 53–54, it will be understood that tang location and tang-bore location (24–25) are selected to avoid interference with air supply to and manifolding within the blade elements 56.

Figure 16:
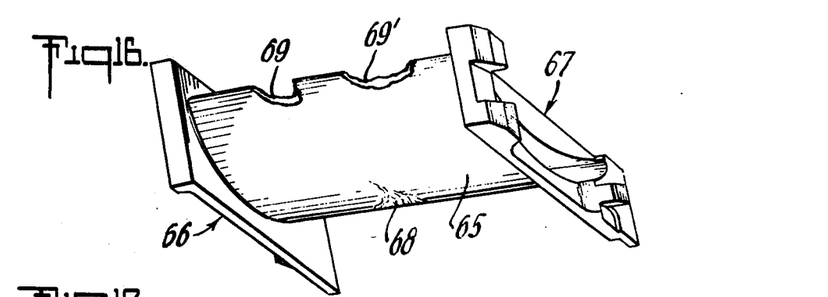
FIG. 16 is a simplified view in perspective of a single-piece nozzle-component assembly, being a buttress-type guide-vane assembly for a jet-aircraft engine, and exhibiting wear such as to render the same unfit for further use, but nevertheless repairable in accordance with the invention.
Figure 17:
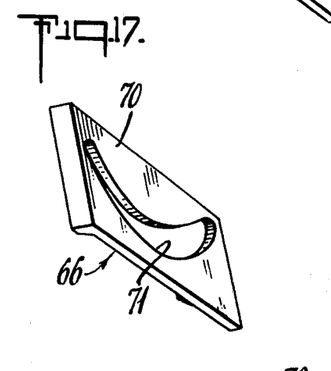
FIG. 17 is a perspective view of the left buttress of FIG. 16, after performing several steps of the invention.
Figure 20:
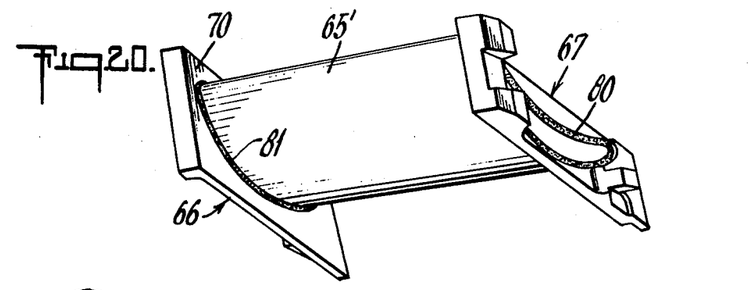
FIG. 20 is a perspective view of the completed reconstruction of the assembly of FIG. 16.

FIGS. 16 and 20 serve to illustrate application of the invention to reconstruction of a nozzle-component assembly, which is shown in FIG. 16 as a severely worn single-piece investment casting, comprising a hollow vane 65 integrally united with buttresses 66–67 at the respective ends of the vane span. Damage to the vane 65 is evident at surface spalling 68 and at regions 69–69' of severe loss of trailing edge material, to the extent that vane 65 can no longer function (with its next adjacent similar vane, in a gas-turbine stage) with anything like acceptable nozzle performance.

Figure 19:
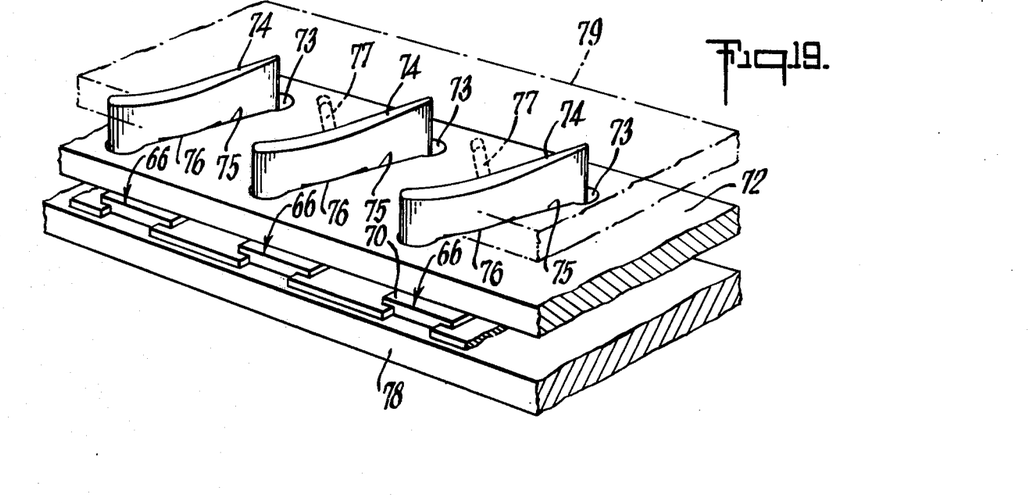
FIG. 19 is a simplified fragmentary perspective view of work-holder and tool-holder parts for performing one of the operations to make the buttress of FIG. 17.

According to the method of the invention, the material of vane 65 is first removed, as by saw cuts close to but spaced from the respective buttresses 66–67. After a stress-relieving heat cycle, the vane-support surfaces 70 of buttresses are machined to the design reference contour and location, whereupon vane sockets 71 are generated in such surfaces by techniques analogous to those described for the auxiliary power unit of FIGS. 1 to 13. For efficient processing, it is preferred to EDM-machined plural sockets 71 at the same time. Thus, in FIG. 19, we show an electrode base or tool-holder 72 as an elongate thick plate, with plural spaced openings 73 for receiving and mounting electrode elements 74 having projecting span ends characterized by the particular airfoil section and relative angle of incidence required at juncture with the vane-supporting surface 71 of each of the respective buttresses 66–67. As with the earlier-described electrode assembly, the electrode element openings 73 are characterized with precisely oriented flat reference surfaces, as at wall 75, to receive and locate a precisely formed flat 76 in the mid-span region of each electrode element and clamp-screw means, suggested at 77, secures the mounting of each electrode element 74, when its trailing edge is abutted to the far end of opening 73. A suitable jig 78 appropriately retains and positions plural machined buttresses 66 with their vane-supporting surfaces facing the correctly profiled airfoil ends of electrode elements 74; in like fashion, a second suitable jig 79 is suggested by phantom outline to position plural machined buttresses 67 in spaced relation with the other correctly profiled airfoil ends of electrode elements 74.

Figure 18:
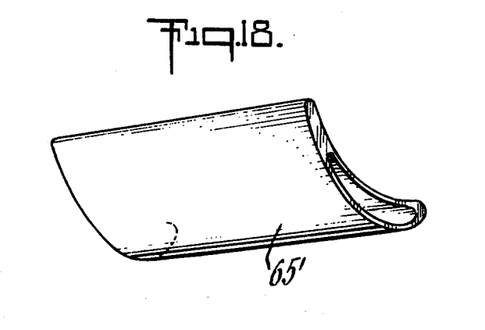
FIG. 18 is a perspective view of a new blade element, for assembly to the buttress of FIG. 17.

After EDM-machining to desired depth, which, in the case of the hollow vane 65 shown, may be all the way through both buttresses, a newly cast blade element 65 (FIG. 18) is assembled to the machined buttresses in the manner already described. Thus, after plating a wettable metal on the span ends of vane 65', the parts 65'-66-67 are clamped in a suitable jig, with span ends of vane 65' substantially flush with outer walls of buttresses 66–67. At the outer adjacent flush interface edges, a weldment 80 is laid, and the filling and brazing step elminiates voids and establishes smooth fillets 81. The remaining steps, including coating, are then performed.

FIGS. 21 to 24 illustrate further apparatus for precision EDM-machining of correlated blade-airfoil recesses in opposed inner faces of two buttress workpieces 100–101, held in suitable work-holding means 102. The tool element 103 is again elongate, with its elongation axis 104 normal to the general plane in which the work-holding means positions the inner faces of buttresses 100–101; in FIG. 21, these inner faces are not identified, but they will be understood to face upwardly, for exposure to EDM-machining by the adjacent downwardly projecting end of the tool element 103. Separate chucking devices 105–106 are provided as parts of the work-holding means 102, for separate accommodation of the respective workpieces 100–101; the structure of these devices 105–106 will be later described, and it presently suffices to indicate that they include suitable locating means whereby the two buttress workpieces are uniquely and correctly located, in image-opposed relation with respect to an upstanding axis 107 of symmetry between the workpieces all as appears from FIG. 23. Holder means 108 for tool element 103 includes a body portion 109 having keyed and reciprocally guided support in frame means 110 secured with respect to the work-holding means 102, the guide axis preferably being coincident with the axis 107 of symmetry. The workpiece axis 104 is offset from the guide axis (symmetry axis) 107 to the extent D, as appropriate for machining the desired inner-face area of one of the buttress workpieces; for the parts relation shown in FIG. 21, this offset is in the left direction, being labeled $D_L$, by reason of tool-element location poised for boring the inner face of the left buttress workpiece 100, held by chuck 105.

Figures 21, 22, 25:
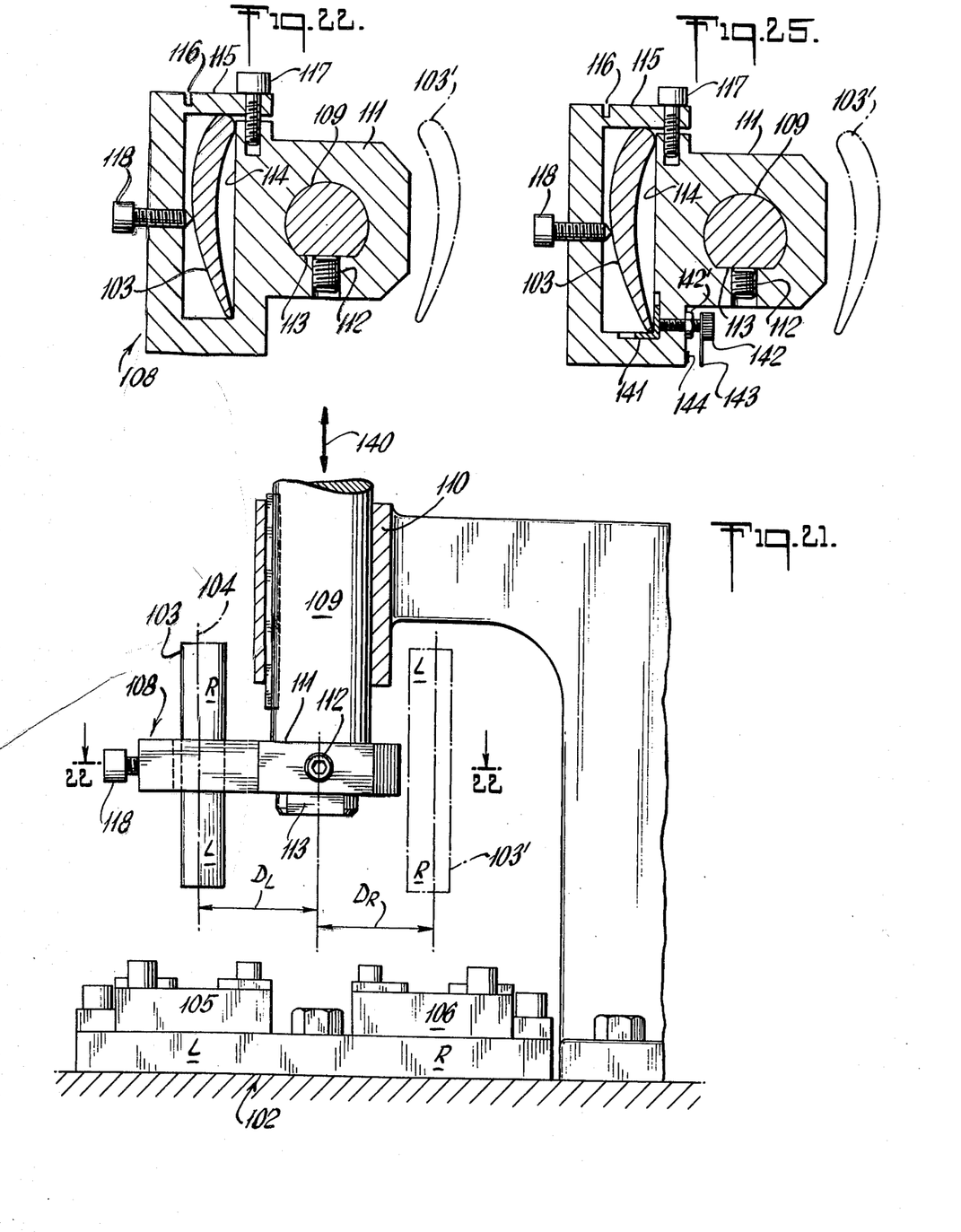
FIG. 21 is a simplified fragmentary view in elevation of modified tool-holder and work-holder apparatus of the invention.
FIG. 22 is a sectional view taken at 22—22 in FIG. 21.
FIG. 25 is a view similar to FIG. 22 to illustrate a modification.

The tool-holding means 108 includes an offset tool-holding arm or plate 111 which has removable and reversible connection to the body portion 109, reliance being shown in FIGS. 21 and 22 for the use of a set screw 112 against a flat 113 to hold a selected one or the other of the reversibly connected relationships. The arm or plate 109 has an enlarged opening for inserted accommodation of the tool element 103, selected as appropriate for the airfoil section to characterize EDM boring. The opening is generally rectangular to provide chordal support and location of the concave side of the airfoil section, at spaced points on a single flat wall 114 of the opening. One 115 of the end walls of the opening is locally weakened (at 116) to permit said end wall to hinge slightly and to be clamped by means 117 against the leading and trailing edges of the tool element 103; positive location of the inserted tool element is completed by additional clamp means 118 urging the described chordal support of the airfoil section.

The tool-holding means 108 has been described in the context of a tool element 103 of constant airfoil section, clamped centrally by means 117–118 so as to project both downwardly toward the buttress 100 in the left L fixture 105 and upwardly away from fixture 105. The upwardly projecting end has been designated R because it is used to EDM-machine the other buttress 101 in the right R fixture 106, upon remounting the offset arm at 112–113 after imagereversing the same, in which reversed position the airfoil section of element 103 appears at the opposite offset $D_R$, suggested by phantom outline 103'.

Figure 23:
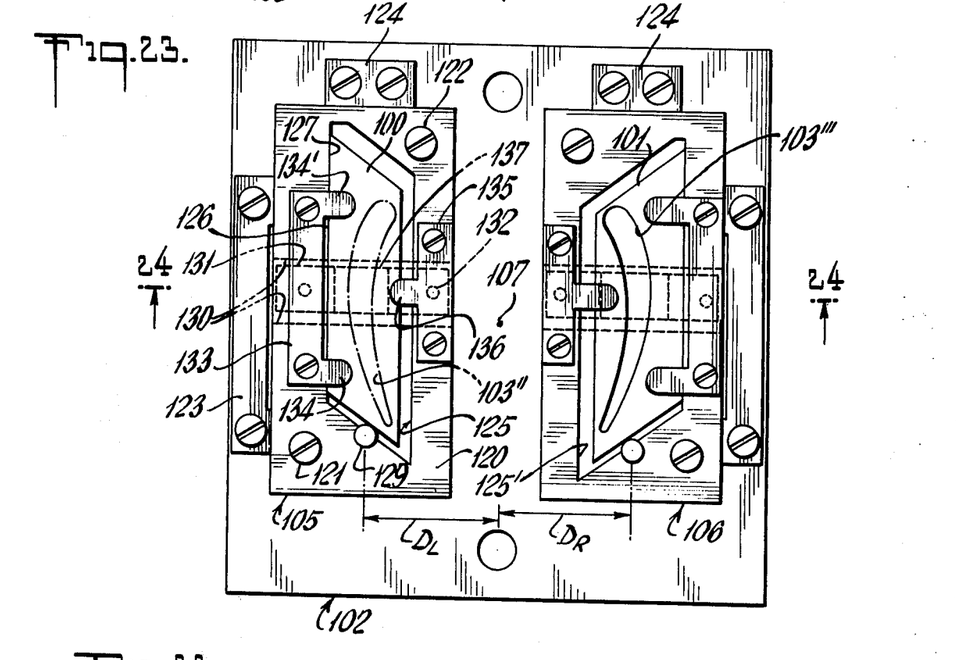
FIG. 23 is a plan view of the work-holder of FIG. 21.
Figure 24:
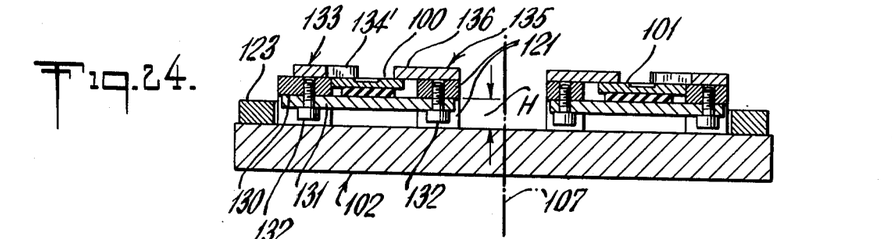
FIG. 24 is a sectional view taken at 24—24 in FIG. 23.

The buttress-clamping fixture 105 is shown to comprise a rectangular base plate 120, which is secured by means 121–122 to the base 102 after first holding the same against corner-reference abutments 123–124 on base 102. Plate 120 is shown with a large parallelogram-shaped central opening 125 within which an applied buttress 100 is insertably received, with a first reference edge 126 of the buttress firmly set against a corresponding edge 127 of opening 125, and with an adjacent reference edge 128 of the buttress firmly set against an upstanding pin 129 fixed to plate 120.

The underside of plate 120 has a milled transverse channel or groove 130 of depth H (FIG. 24) to permit insertion of a buttress-support bridge 131, held by means 132 to the base 120. On one side of the upper face of base 120, a first upper-abutment bar 133 is mounted, to project buttress-limiting lugs 134–134' over the opening 125 and along the reference edge 127; on the other side, a second upperabutment bar 135 is similarly mounted, to project a single central buttress-limiting lug 136 over the opposite side of opening 125. The applied buttress 100 is resiliently loaded by a resilient pad 137 which is compressed between bridge 131 and buttress 100 when bar 135 is applied to clamp the inserted buttress, care being taken that in the thusclamped position reference contacts are achieved along edge 126 and at stop 129, as previously explained.

The clamp at 106 is exactly as described for clamp 105, except that its buttress-receiving opening 125' is imagereversed in orientation with respect to opening 125 and the central plane of symmetry through axis 107. FIG. 23 additionally illustrates the typical situation wherein one buttress 100 of a given pair is smaller than the other buttress 101 of the pair, by reason of the ultimate annular assembled relation of plural buttressed-vane subassemblies. However, in spite of the difference in buttress sizes and shape (e.g., 100 vs. 101), the holding fixture of FIGS. 23–24 will be seen to provide correct offsets $D_L$ and $D_R$ for successive EDM-machining of the desired airfoil recesses 103''–103''' in buttresses 100–101. The particular feed mechanism for the machining operation forms no part of the invention and is therefore merely suggested by heavy arrows 140 in FIG. 22, it being understood that the offset arm 111 is image-reversed in its mount at 112–113 for each of the successive reciprocating cycles of feed means 140 to accomplish image-boring of recesses 103''–103''' in buttresses 100–101.

As thus far described, the tool-holding means and workholding means of FIGS. 21 to 24 will properly machine the recesses 103''–103''' on successive buttress pairs 100–101, all to the precision which will enable repetitive construction of vane subassemblies of the same class. Class may be changed by substitution of a tool element 103 of desired configuration as dictated for the changed class; this substitution technique is referred to as "bending" the airfoil.

On the other hand, the invention lends itself to change of class, using the same tool element 103, by making appropriate change in orientation of the airfoil section of the tool element 103 as retained by means 117–118. Such adjustment is illustrated in the slightly modified holder of FIG. 25, which will be recognized for its similarity to FIG. 22. In FIG. 25, a displaceable shoe element 141 (guided in a suitable recess in body 111) is the corner reference for the trailing edge of tool element 103, and a jack screw 142 with indicating pointer 143 is applied to incrementally rotate the airfoil section about an axis within its section (near the leading edge region) in establishing a change in class; a lock nut 142' secures a given adjustment. Markings on the surface 144 beneath pointer 143 may be calibrated for particular desired class, so that by having set the tool element 103 in holder 108 for desired adjusted class, the recesses 103''–103''' will be correctly generated in buttresses 100–101, as appropriate for ultimate assembly to create a buttressed vane of the prescribed class. Thus, whatever the desired class, the same blade-element section may be used in the buttress pairs bored with our apparatus.

Figures 26, 27:
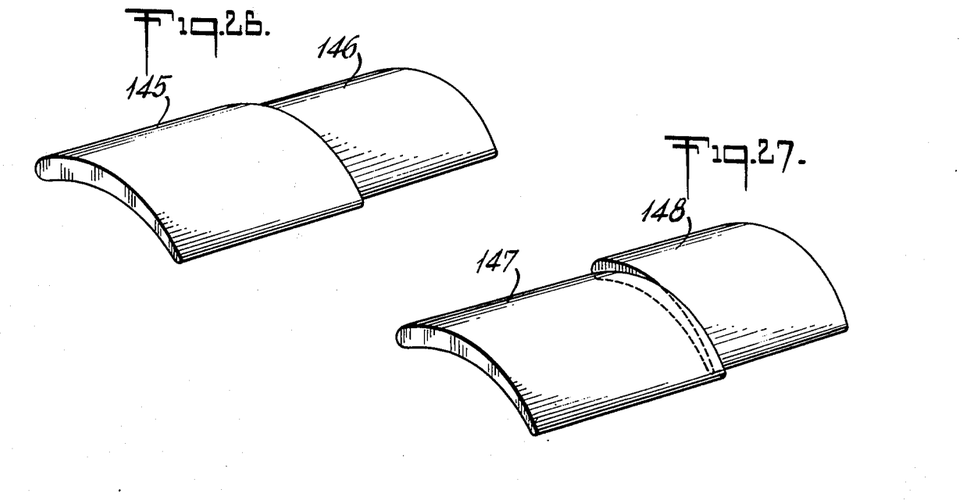
FIGS. 26 and 27 are similar perspective views of tool elements alternatively usable in the tool-holding means of FIGS. 21 and 22.

In some cases, the blade section varies as a function of blade span; thus, the airfoil section at the smaller buttress 100 may be smaller than the airfoil section at the larger buttress 101. For such situations, we prefer a tool element made of two interconnected lengths of constant airfoil section, as for example suggested by the tool of FIG. 26, wherein one 145 of the sections is larger and longer than the other 146, to permit clamping on one of the sections 145 while allowing substantial projection of the EDM boring profiles as appropriate for the respective buttresses.

In still further applications, the airfoil section at juncture with one buttress 100 is at a different angular orientation as compared with that at the other buttress 101, i.e., the buttressed vane is to have a blade twist between ends of its span. For such purposes, we show in FIG. 27 a tool wherein the constant section at one end length 147 is angularly displaced with respect to the constant section at the opposite end length 148, the lengths 147–148 being fixed at the desired twist or angular offset, and the location of such fixed connection being other than central, so as to permit clamped mounting by means 117–118 acting on the longer one of the two lengths 147–148.

While the particular tool element 103 has been shown for EDM boring normal to the general plane of buttress inner-face orientation, it will be understood that other orientations may be indicated for particular applications. Generally speaking, however, such normal-oriented boring will be found to be satisfactory for most cases because the depth of bored recesses is not great enough to create a special problem for an inserted blade to be secured at other-than-normal orientation.

It will be seen that the described invention achieves all stated objects and that, although described particularly in connection with repair of worn nozzle assemblies and nozzle-component assemblies, it is also applicable to new construction of such assemblies. Vanes may be restored to a condition which in some respects exceeds the capability of original investment castings, in that new vane-element parts may be the result of optimizing material selection, for resistance to high-temperature abrasion, and for optimum diffusion coatability, in the context of less severe casting or other fabrication limitations. The indicated EDM techniques bring tool-room accuracy to the layout and assembly of the repaired structures, with resultant close control of nozzle-throat area, for a specified vane class. Assemblies built according to the invention are inherently braced to restrain and contain damage flowing from burstwheel conditions, due to the socketed fit of the parts. The technique of welding and brazing assures utmost rigidity and integrity of the completed article, under the most extreme temperature cycles encountered in use. Finally, the technique of tool-holder construction and electrode-element retention provides relatively simple and precise controlled selection of class number, for the ultimately assembled article, without requiring any change in the vane element inserted into the vane-supporting members of the assembly.

While the invention has been described in detail for the preferred forms shown, it will be understood that modifications may be made without departing from the invention.

What is claimed is:

1. An EDM tool holder comprising a plate with a through opening having one elongated flat wall, and an electrode element of predetermined airfoil section accommodated in said opening with at least one end of the span dimension of said element projecting outside said plate, a portion of a convex surface of said section having a flat-bottomed recess in the region of reception in the opening, the flat bottom of said recess abutting said flat wall, and clamp means acting between said plate and said element for holding a firmly referencing abutment of said flat bottom and wall surfaces.

2. The tool holder of claim 1, wherein said convex airfoil surface extends between leading and trailing edges, and wherein said opening includes a trailing-edge locating abutment portion offset from said flat wall.

3. The tool holder of claim 1, wherein said flat-bottomed recess is at substantially mid-span of said electrode element, said element projecting beyond opposite faces of said plate.

4. The tool holder of claim 1, wherein said clamp means comprises screw means in a tapped hole between said opening and a side edge of said plate and generally directed at the flat wall portion of said opening.

5. The tool holder of claim 1, wherein said plate is circular and the opening is one of a plurality of like angularly spaced openings, the flat-wall portions of all of which are equally angularly spaced, all said flat-wall portions being at the same angle of incidence with respect to similarly spaced radial strobe lines to corresponding points of strobeline intersection with said flat-wall portions.

* * * * *